(12) United States Patent
Pattakos et al.

(10) Patent No.: US 9,022,005 B2
(45) Date of Patent: May 5, 2015

(54) ROTARY ENGINE

(71) Applicants: Manousos Pattakos, Nikea Piraeus (GR); Argyro Pattakou, Marousi Athens (GR); Emmanouel Pattakos, Nikea Piraeus (GR)

(72) Inventors: Manousos Pattakos, Nikea Piraeus (GR); Argyro Pattakou, Marousi Athens (GR); Emmanouel Pattakos, Nikea Piraeus (GR)

( * ) Notice: Subject to any disclaimer, the term of this patent is extended or adjusted under 35 U.S.C. 154(b) by 228 days.

(21) Appl. No.: 13/733,138

(22) Filed: Jan. 2, 2013

(65) Prior Publication Data

US 2013/0183183 A1    Jul. 18, 2013

(30) Foreign Application Priority Data

Jan. 12, 2012    (GB) .................................. 1200472.7

(51) Int. Cl.

| F02B 53/00 | (2006.01) |
|---|---|
| F02B 33/00 | (2006.01) |
| F01C 3/00 | (2006.01) |
| F03C 2/00 | (2006.01) |
| F03C 4/00 | (2006.01) |
| F04C 2/00 | (2006.01) |
| F04C 18/00 | (2006.01) |
| F01C 21/00 | (2006.01) |
| B64C 39/02 | (2006.01) |
| F01C 1/063 | (2006.01) |
| B64C 27/08 | (2006.01) |
| F02B 75/02 | (2006.01) |

(52) U.S. Cl.
CPC .......... *F01C 21/008* (2013.01); *F02B 2075/027* (2013.01); *F02B 53/00* (2013.01); *B64C 39/026* (2013.01); *F01C 1/063* (2013.01); *B64C 2201/024* (2013.01); *B64C 2201/044* (2013.01); *B64C 27/08* (2013.01)

(58) Field of Classification Search
CPC   B64C 27/08; B64C 39/026; B64C 2201/024; B64C 2201/044; F01C 1/063; F01C 21/008; F02B 53/00; F02B 2075/027
USPC ..................... 123/241, 561; 418/68
See application file for complete search history.

(56) References Cited

U.S. PATENT DOCUMENTS

| 2,364,871 | A | * | 12/1944 | Reissner ........................ 416/148 |
|---|---|---|---|---|
| 2,640,549 | A | * | 6/1953 | Isacco ............................ 416/22 |
| 2,642,807 | A | * | 6/1953 | Linderman ..................... 418/18 |
| 3,712,081 | A | * | 1/1973 | Philipp et al. ................. 464/112 |
| 4,688,522 | A | * | 8/1987 | McMaster ...................... 123/1 A |
| 5,171,142 | A | * | 12/1992 | Proglyada ...................... 418/68 |
| 7,270,106 | B2 | * | 9/2007 | Stark ............................. 123/241 |
| 7,681,549 | B2 | * | 3/2010 | Huettlin ......................... 123/241 |

* cited by examiner

*Primary Examiner* — Thai Ba Trieu
*Assistant Examiner* — Deming Wan

(57) ABSTRACT

In a "cat and mouse" rotary engine two rotor-pistons are connected by concentric crosses to two inclined power shafts, improving the balance of the engine, ridding the bearings of the rotor-pistons from heavy idle loads, allowing lighter and more robust structure and making the arrangement proper for divided load applications like portable flyers, REM etc.

10 Claims, 11 Drawing Sheets

ROTARY ENGINE

In the closest prior art (patent application GB1018399.4, patents GB454,350A, GB465211A, U.S. Pat. No. 2,642,807 A, FR1305810A and U.S. Pat. No. 3,712,081 A) an inclined, relative to the rotation axis of a rotor piston, power shaft has two forks secured on it; the one fork connects by a cross (which is either a conventional cross, like those in the common cardan joints, or a ring-cross comprising pivots, in a cross arrangement, at the periphery of a ring member) to one rotor-piston, while the other fork of the power shaft connects by another cross to another rotor-piston.

Among the advantages of such rotary engines are their simplicity, their free breathing, their compactness, their lightweight etc.

This invention relates to a rotary engine/pump comprising: a casing 1; a first rotor-piston 2 rotatably fitted in said casing 1; a second rotor-piston 3 rotatably fitted in said casing 1, the first rotor piston 2 and the second rotor-piston 3 having a common axis of rotation 4; a first power shaft 5 rotatably mounted on said casing 1, the first power shaft 5 is disposed at one end of the two rotor pistons 2 and 3, the rotation axis 7 of the first power shaft 5 is substantially inclined to the common rotation axis 4; a second power shaft 6 rotatably mounted on said casing 1, the second power shaft 6 is disposed at the other end of the two rotor-pistons 2 and 3, the rotation axis 8 of the second power shaft 6 is substantially inclined to the common rotation axis 4, the rotation axis 7 of the first power shaft 5, the rotation axis 8 of the second power shaft 6 and the common axis of rotation 4 are coplanar, the inclination of the rotation axis 7 relative to the common rotation axis 4 is substantially equal to the inclination of the rotation axis 8 relative to the common rotation axis 4, a fork 10 of the first power shaft 5 is connected by a cross 9 to the first rotor-piston 2, a second fork 14 of the first power shaft 5 is connected by a cross 13 to the second rotor-piston 3, the centers of both crosses 9 and 13 are on the point where the common rotation axis 4 and the rotation axis 7 intersect, a fork 12 of the second power shaft 6 is connected by a cross 11 to the first rotor-piston 2, a second fork 16 of the second power shaft 6 is connected by a cross 15 to the second rotor-piston 3, the centers of both crosses 11 and 15 are on the point where the common rotation axis 4 and the rotation axis 8 intersect, so that the two power shafts rotate in synchronization to each other without additional synchronizing means, so that the power is shared between the two power shafts, so that the loads on the bearings of the two rotor-pistons are substantially reduced, so that the inertia vibrations are substantially reduced.

Figure 1:
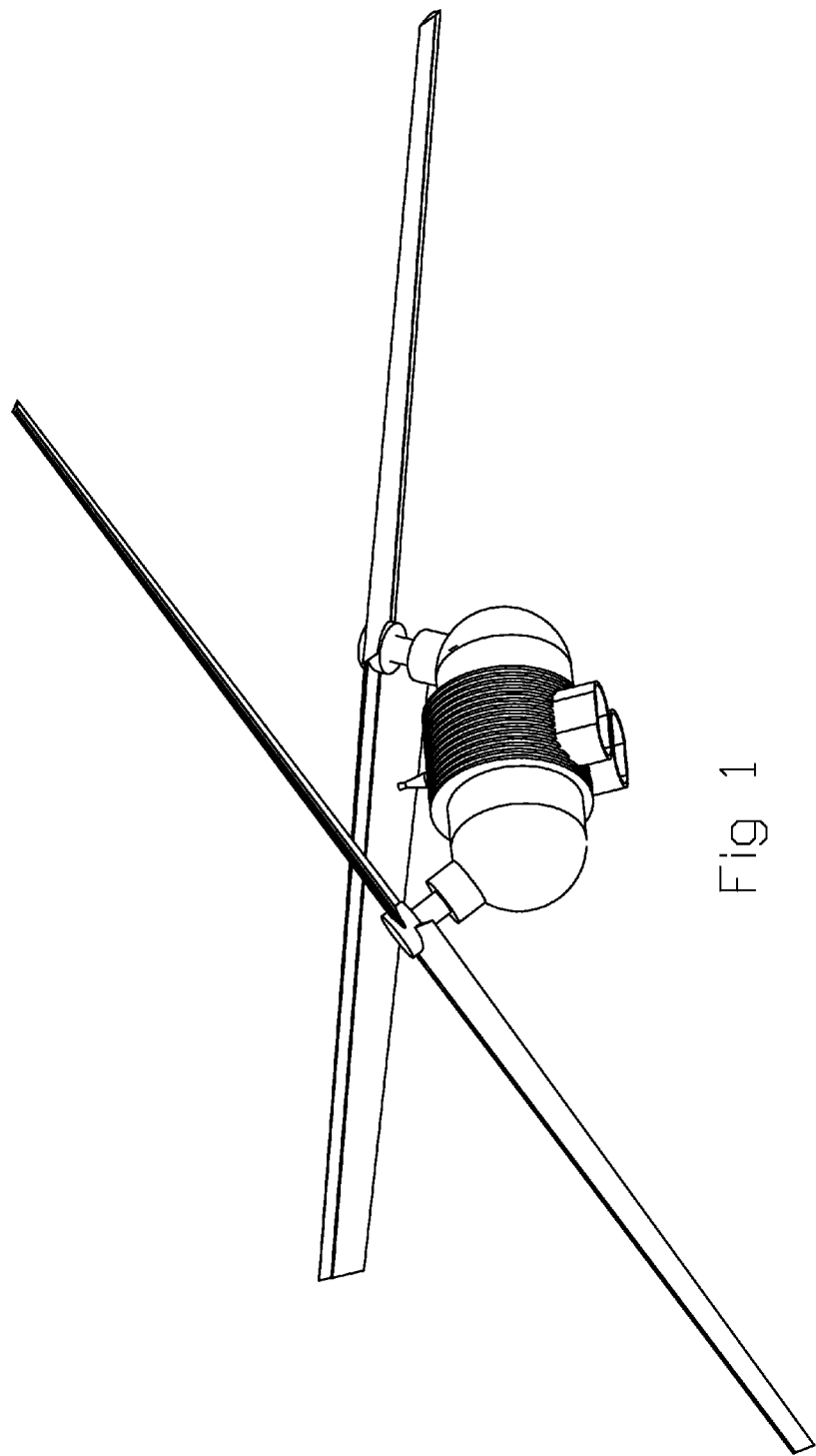
FIG. 1 shows a first embodiment wherein the rotary engine drives two counter-rotating intermeshing propellers.
Figure 2:
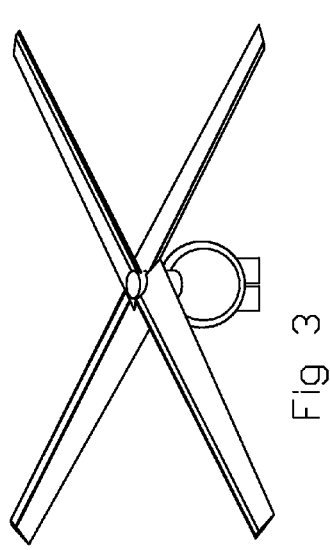
FIG. 2 shows the first embodiment from a different viewpoint.
Figure 3:
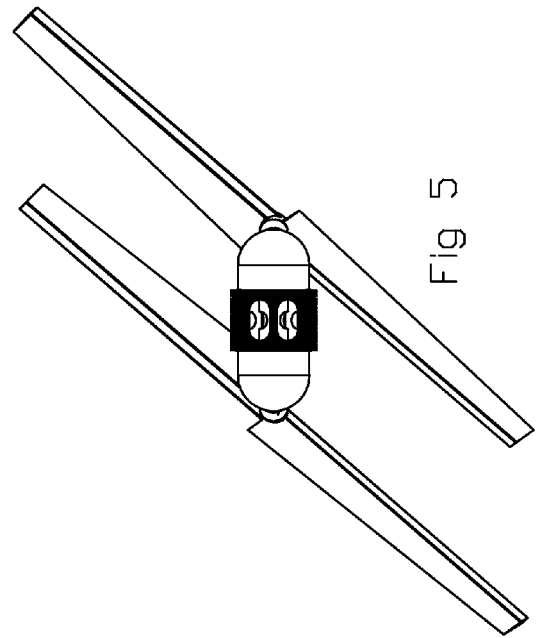
FIG. 3 shows the first embodiment from a different viewpoint.
Figure 4:
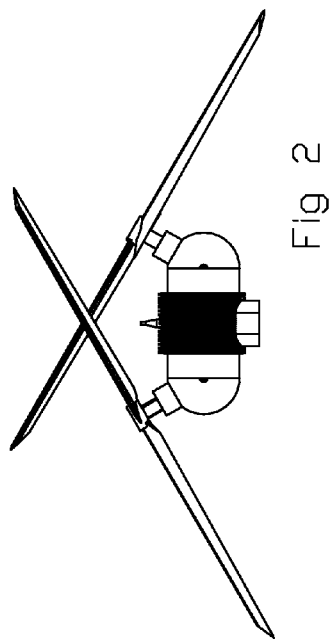
FIG. 4 shows the first embodiment from a different view point.
Figure 5:
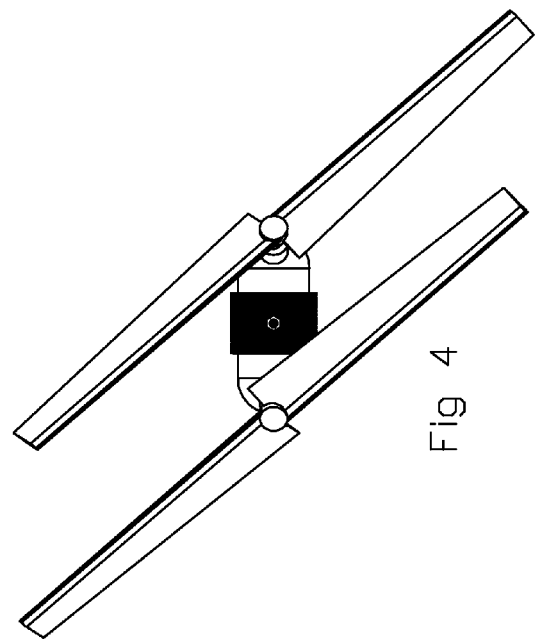
FIG. 5 shows the first embodiment from a different viewpoint.
Figure 6:
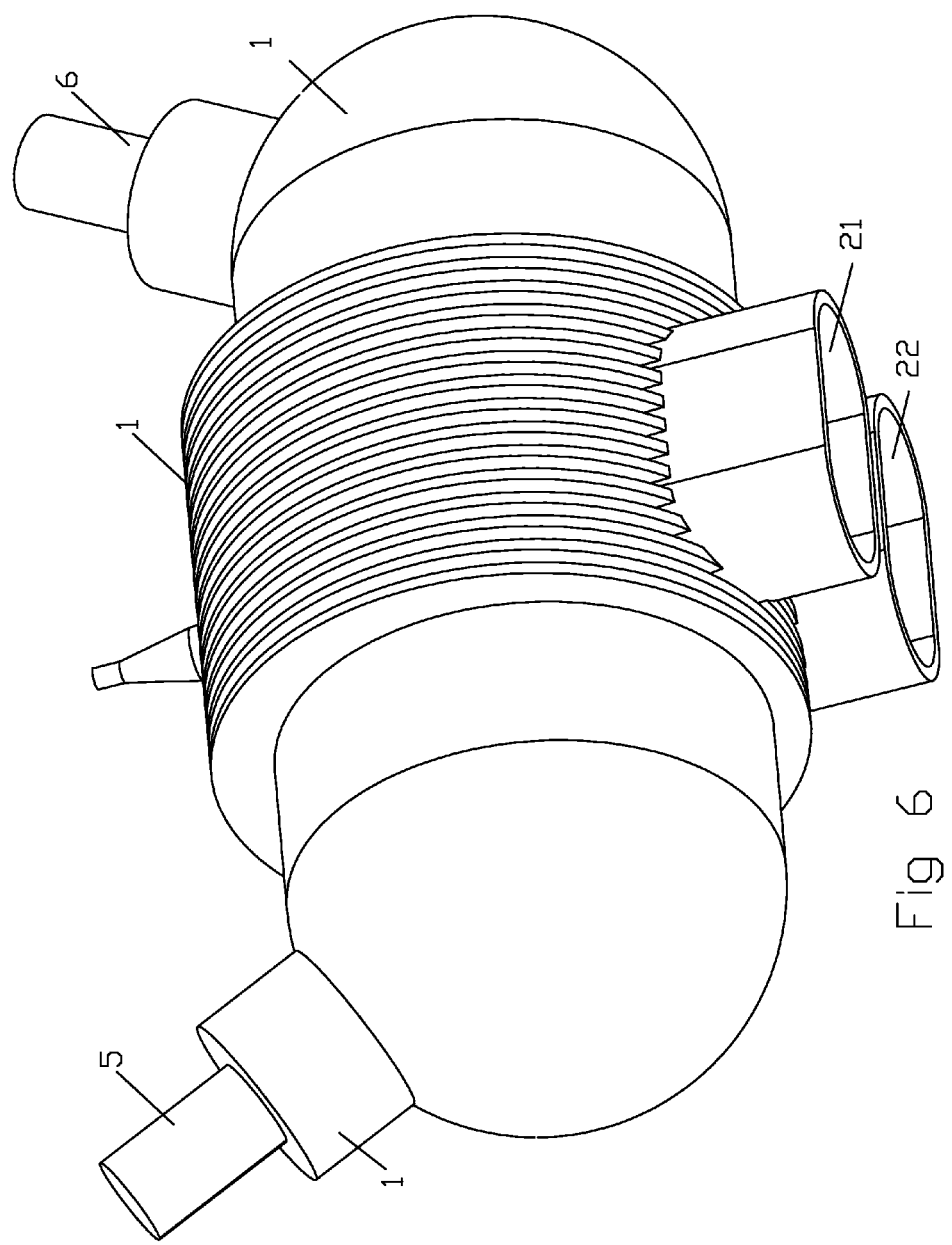

FIG. 6 shows the rotary engine alone. At the lower side they are shown the inlet and the exhaust ports. At the middle-top is shown the spark plug (or the glow plug).

Figure 7:
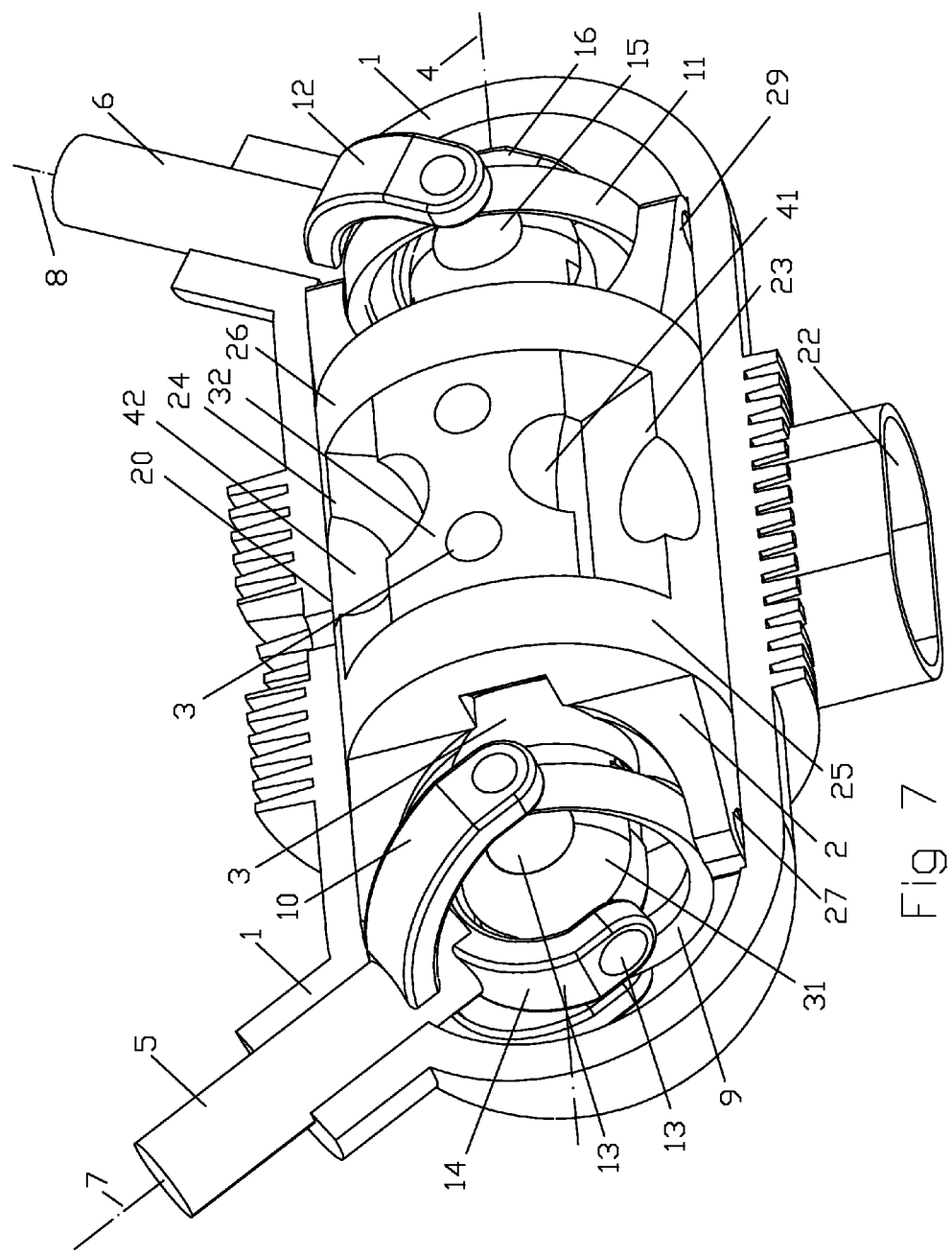

FIG. 7 shows the same engine with the casing sliced to show the internals.

Figure 8:
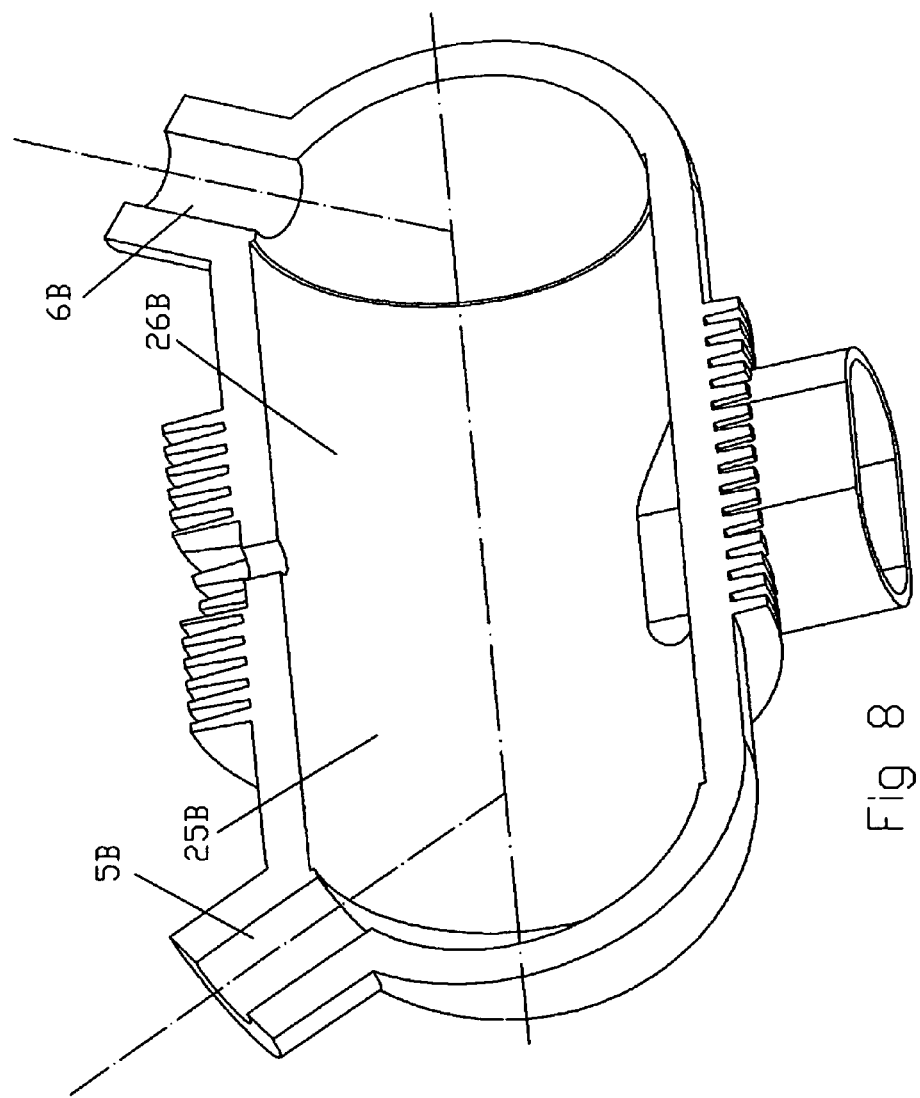

FIG. 8 shows the casing sliced. Bearings like 25B and 26B can be used to support the first rotor piston 2 on the casing 1. Bearings 5B and 6B support the power shafts 5 and 6 on the casing.

Figure 9:
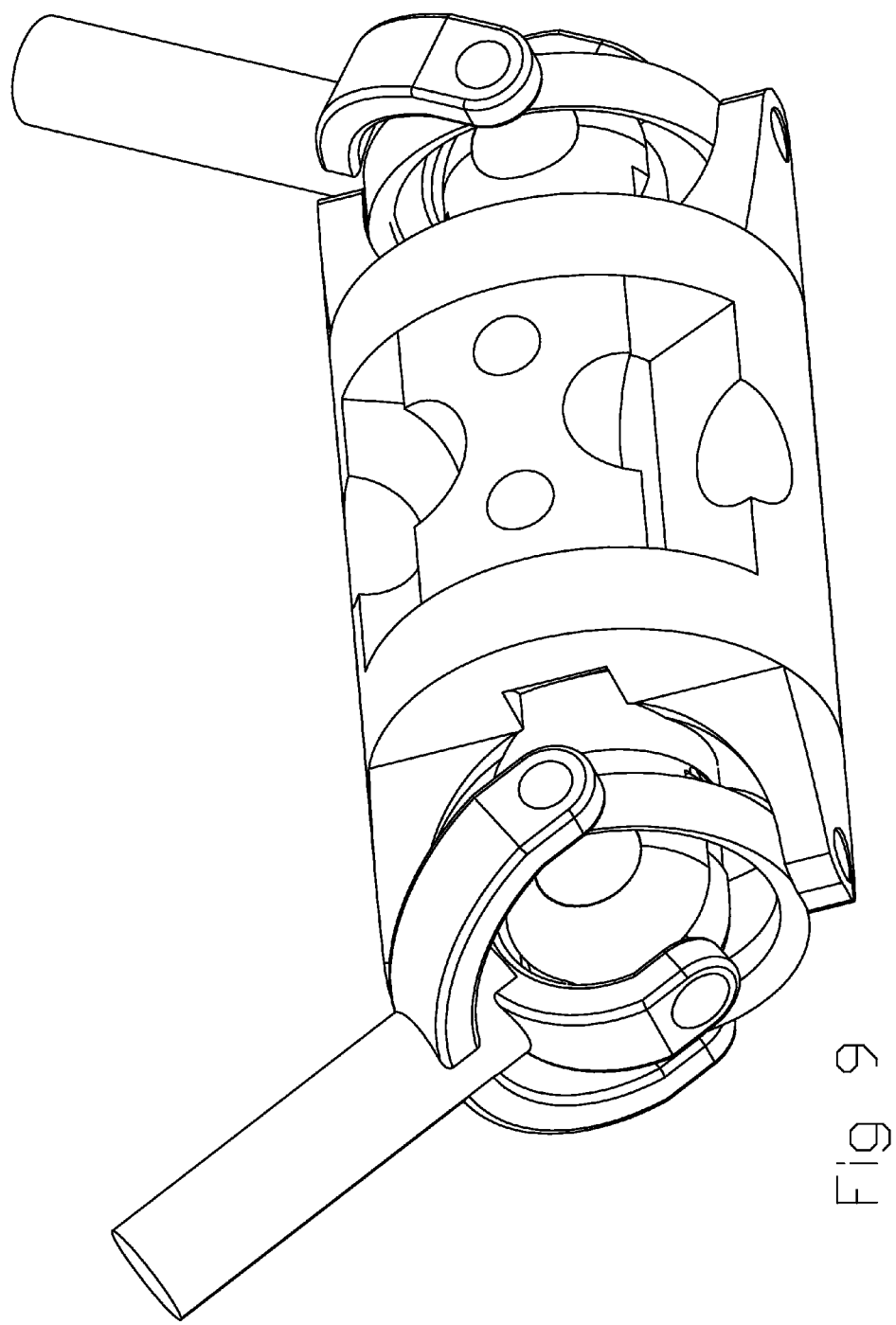

FIG. 9 shows the moving parts of the engine of FIG. 6.

Figure 10:
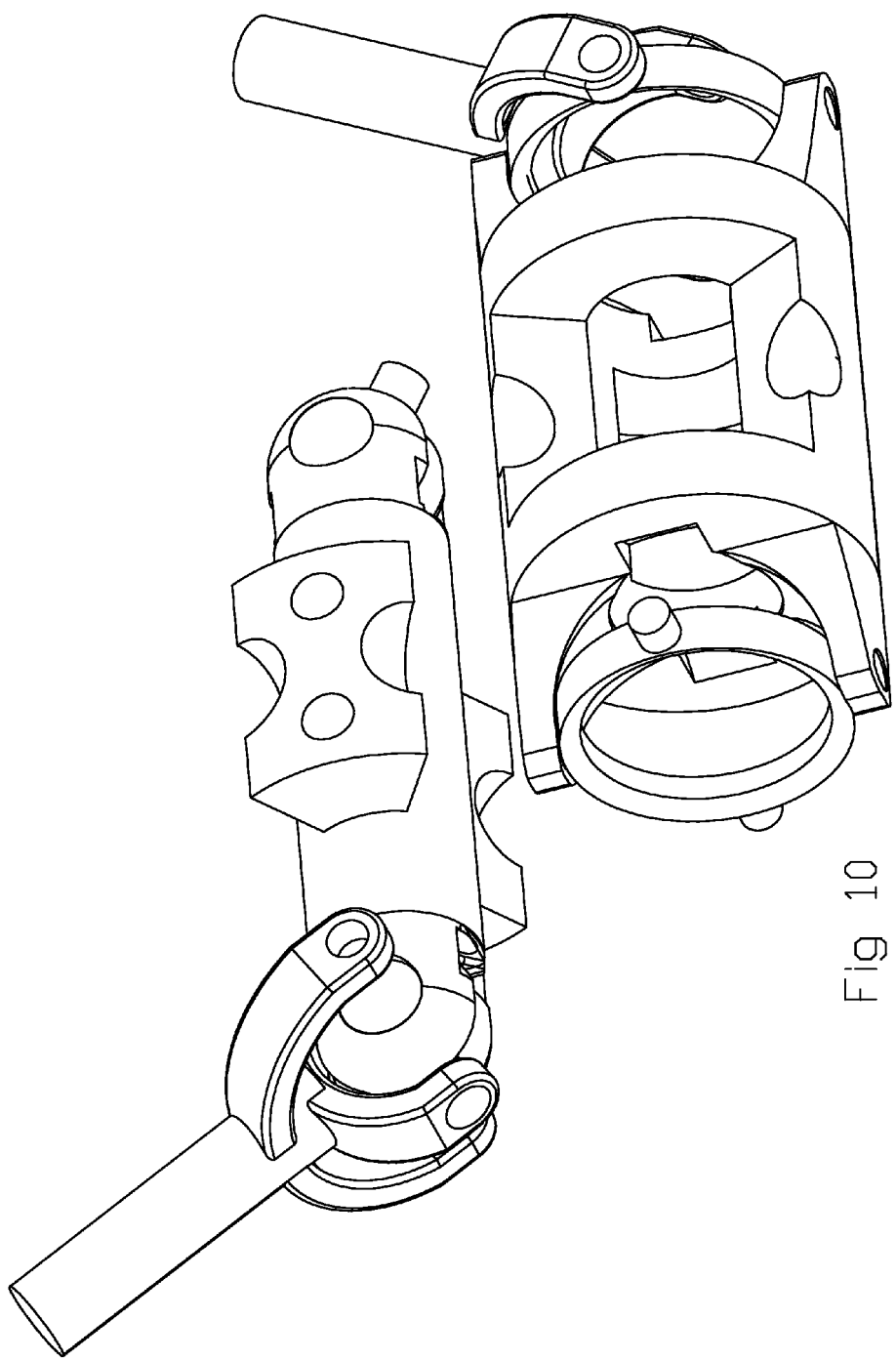

FIG. 10 shows the moving parts partly disassembled. The left power shaft is connected to the second rotor-piston at top, the right power shaft is connected to the right side of the first rotor-piston at bottom.

Figure 11:
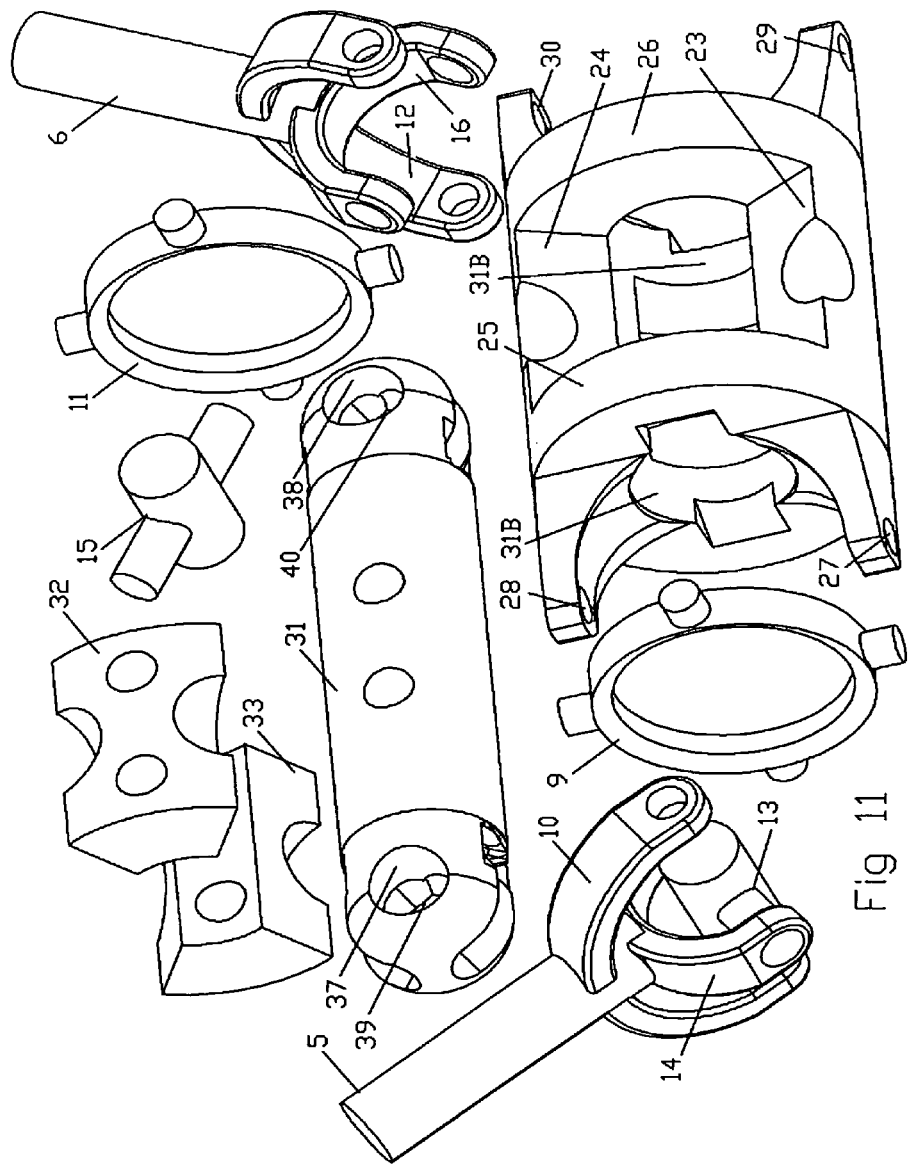

FIG. 11 shows the moving parts of the engine, disassembled. Bearings like 31B can be used to support the shaft 31 of the second rotor-piston 3 on the first rotor-piston 2.

Figure 12:
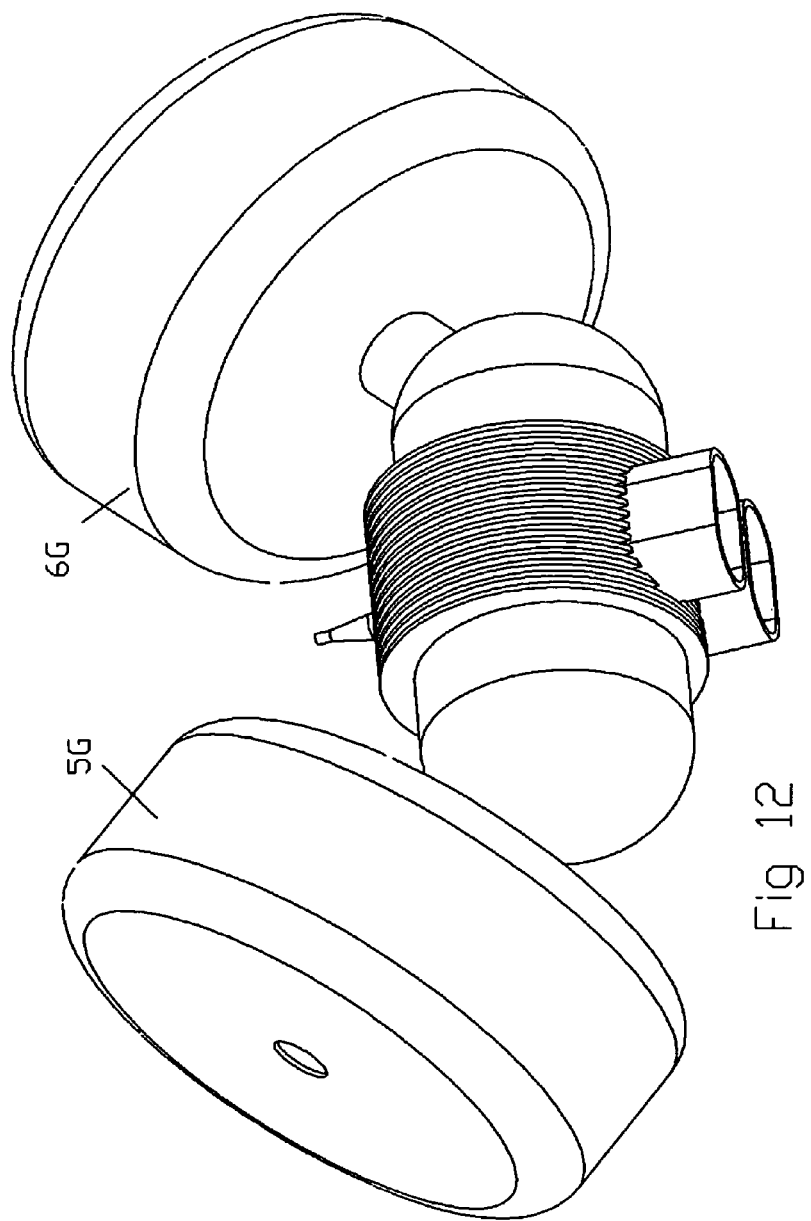

FIG. 12 shows a second embodiment wherein the Vee angle of the two power shafts is wider, and wherein the two power shafts directly drive two counter-rotating electric generators 5G and 6G.

Figure 13:
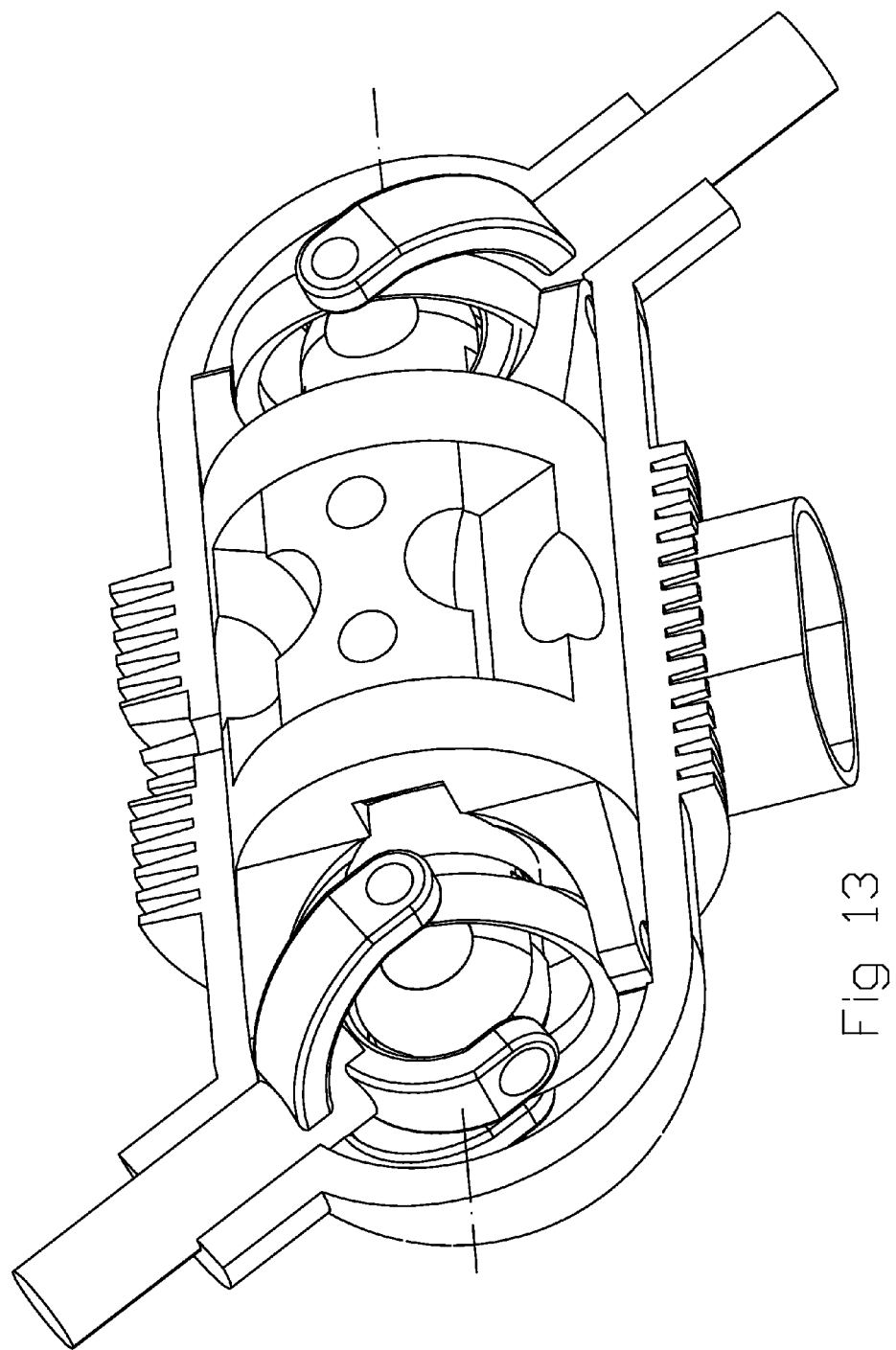

FIG. 13 shows an embodiment wherein the power shafts are parallel.

Figure 14:
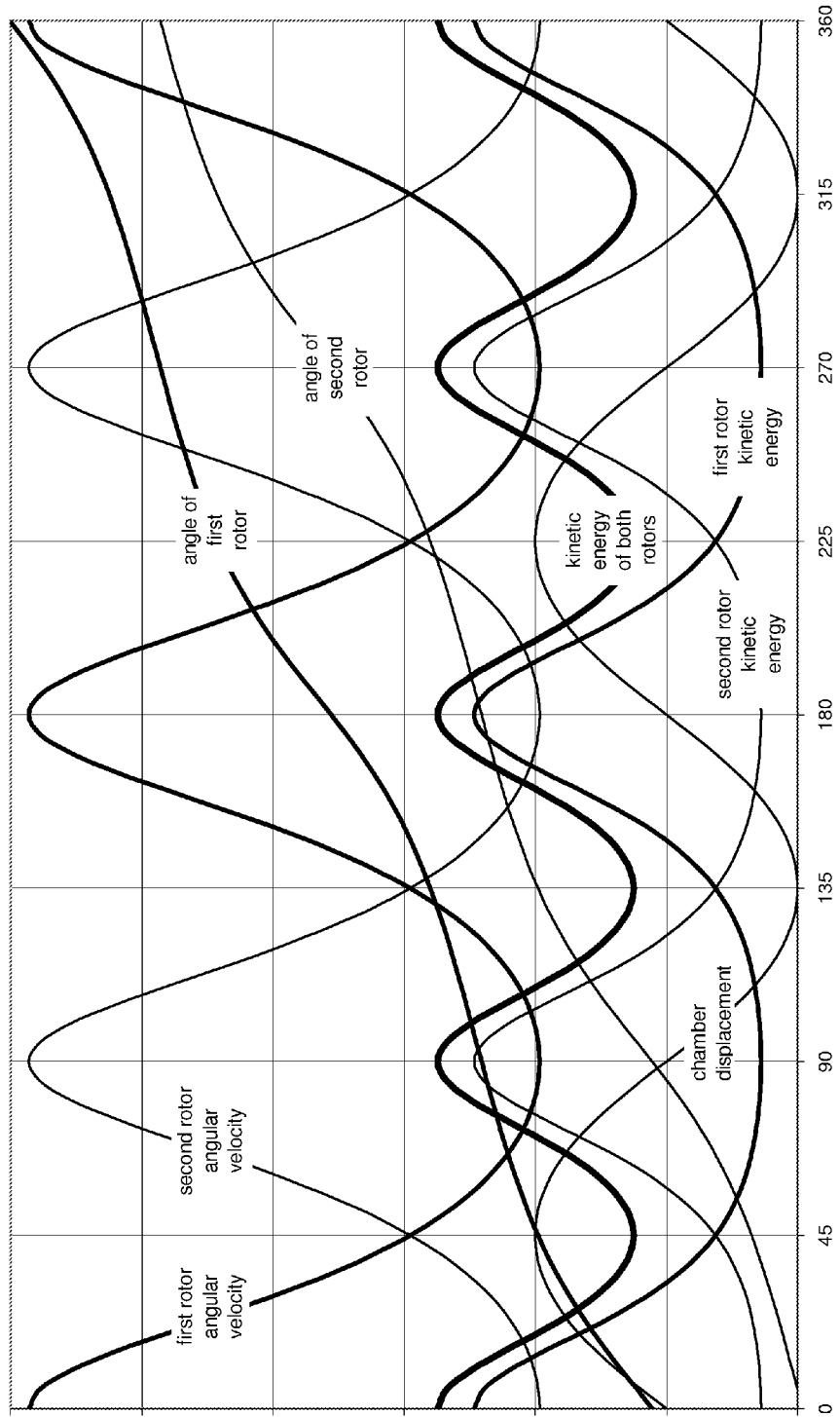

FIG. 14 shows the variation of the total kinetic energy of the two rotor-pistons as the power shaft rotates.

In the prior art, in patents like U.S. Pat. No. 3,899,269, U.S. Pat. No. 2,253,445 and U.S. Pat. No. 4,949,688, an oblique power shaft is passing through the center of a toroidal cavity; a centrally located double-cross (central double-cross architecture) interconnects the power shaft with the two rotor-pistons; with the double-cross constrained into the limited space at the center of the toroid, the inclination of the power shaft is limited, the structure is not robust, the power density is poor, etc. In the closest prior art, instead of a centrally located double-cross, an offset single-sided double-cross (single-sided double-cross architecture) is disposed out of the toroidal cavity, at the one side of the toroidal cavity, interconnecting an inclined power shaft with two rotor-pistons, so that the toroidal cavity poses no limit on the double-cross dimensions and strength.

In the present invention two double-crosses are disposed at both sides of the toroidal cavity (double-sided double-cross architecture); the one pair of crosses interconnects the one side of the two rotor-pistons with a first inclined power shaft, while the other pair of crosses interconnects the other side of the two rotor pistons with a second inclined power shaft.

Without synchronizing gearing, the double-sided double-cross architecture can provide two synchronized, counter-rotating power shafts; this enables divided load applications like a power set, or REM (Range Extender Module), with two electric generators, or like a portable flyer having two counter-rotating intermeshing propellers. This way the "problem" of the inclined power shaft of the closest prior art becomes the "solution" as explained in the following.

The central double-cross architecture and the single-sided double cross architecture overloads the bearings of each rotor-piston by a strong pair of forces laying on a plane containing the rotor axis and requires a longer distance between the bearings of each rotor piston in order to take these loads; in the double-sided double-cross architecture with the two power shafts arranged in a Vee, the two opposite torques on the two sides of the rotor-piston offset one another ridding the rotor-piston bearings from heavy idle loads and enabling shorter distance between the double-cross and the combustion chamber.

FIG. 14 shows the angle of the two rotor-pistons relative to the rotation angle of the power shaft, it also shows the angular velocity of the two rotor-pistons, the kinetic energy of each rotor-piston, the total kinetic energy of the two rotor-pistons in the case of constant angular velocity of the power shaft and the displacement of the one combustion chamber versus the rotation angle of the power shaft.

The plot of FIG. 14 is applicable in both, the single-sided double cross rotary engines of the prior art, and the double-sided double-cross rotary engine disclosed in this invention. The kinematic mechanism causes a strong variation of the total kinetic energy of the two rotor-pistons during a shaft rotation. From 0 to 45 degrees the total kinetic energy of the two rotor-pistons decreases, while from 45 to 90 degrees the total kinetic energy of the two rotor pistons increases. Thereby, a torque is necessary to take away from the assembly of the two rotor-pistons the additional energy (0 to 45 degrees), and then to restore this energy back to the two rotor-pistons assembly (45 to 90 degrees). Similarly a torque is necessary to act on the flywheel (on the shaft) transmitting the surplus energy from the two rotor-pistons assembly (0 to 45 degrees) and taking back to the two rotor-pistons this energy (45 to 90 degrees). These two torques are at different directions and generate a third torque on the engine casing about the bisecting line of the angle between the rotor-piston axis and the power shaft axis.

In the case of the single-sided double-cross architecture of the closest prior art, the abovementioned third torque causes a torsional vibration of the engine about the abovementioned bisecting line.

In comparison, on the casing of the double-sided double-cross architecture with the power shafts in Vee, the "third" torque that loads the casing at the one side of the cylinder plus the "third" torque that loads the casing at the other side of the cylinder give a total torque which is half in size (in the case of 60 degrees angle between the two shafts) and tends to rotate the engine about the rotor-piston axis.

Similarly for the pressure loads: in the single-sided double-cross architecture of the prior art, the pressure inside the combustion chamber during the compression the combustion and the expansion, generates a torque on the one rotor-piston and an opposite torque on the other rotor-piston; through the double cross, these two torques act onto the shaft to give useful torque to the load. The reaction from the considerably inclined shaft causes a strong reaction torque on each rotor-piston: the more oblique, relative to the cylinder axis, the position of the cross between the shaft and a rotor, the heavier the reaction pair of forces on a plane including the cylinder axis, that overloads the bearings of the rotor by idle loads. One way to offset this, is by dividing the load into two double crosses at the two sides of the rotors, so that the idle/useless loads on the bearings of the rotors are minimized, while each cross outputs only half of the working/useful torque.

More specifically:

For the power shaft angle shown in FIGS. 7 to 11, the plane of the cross 9 (i.e. the plane wherein the axes of the four pivots of the cross lie) is perpendicular to the common axis 4, while the plane of the cross 13 is substantially inclined (60 degrees away from being perpendicular) relative to the common axis 4.

The pair of forces the cross of a cardan joint transfers between the two shafts it connects, is always on the plane of the cross. So, with the cross 9 perpendicular to the common axis 4, the idle torque resulting onto the rotor-piston 2 is zero, and with the angle between the common axis 4 and the plane of the cross 13 being 30 degrees, the idle torque resulting onto the rotor-piston 3 is twice as heavy as the working torque applied from the power shaft 5 to the rotor-piston 3.

The pair of forces the cross 13 undergoes is analyzed in a working pair of forces lying on a plane perpendicular to the common axis 4, and another (double in magnitude, because the angle is 60 degrees) pair on a plane containing the common axis 4 which overloads the bearings of the rotor-piston 3. In the double-sided double-cross architecture with the power shafts in Vee, the cross 15 at the opposite side of the rotor-piston acts on the rotor-piston 3 with an equal and opposite idle torque that does load the structure of the shaft 31 in bending but does not load its bearings.

After 90 degrees of rotation of the power shafts, the crosses 13 and 15 are perpendicular to the common shaft 4, while the other two crosses 9 and 11 are substantially inclined relative to the common shaft 4. Now it is the rotor-piston 2 that undergoes bending loads, but again the two symmetrical crosses 9 and 11 at its two ends offset the idle loads on its bearings.

With the double-sided double-cross architecture of this invention, either with parallel power shafts or with the power shafts in Vee, the only inevitable bearings are those supporting the two power shafts on the casing and those of the crosses; in such a case the two rotor-pistons are hanged by the crosses and rotate without touching each other or the casing, impossible in the prior art.

Starting with the drawings of this invention and eliminating the mechanism of the one side, i.e. eliminating the one power shaft and its two crosses, what is left is the prior art and it still works, but now the first rotor-piston and the second rotor-piston become cantilever, relative to the bearing which make necessary the touching/bearing/supporting of the second rotor-piston by the first rotor-piston and the touching/bearing/supporting of the first rotor piston by the casing.

For the Inertia Vibrations:

In the single-sided double-cross architecture the free inertia torque causes torsional vibrations of the engine about the bisecting line of the angle between the rotor axis and the shaft axis.

In the double-sided double-cross architecture with the power shafts in Vee, the free total inertia torque halves in strength, while the engine vibrates about the common rotation axis of the rotor pistons.

For the Working Torque:

In the single-sided double-cross architecture of the prior art, the pressure inside the combustion chamber during the compression, the combustion and the expansion, generates a torque on the one rotor-piston and an opposite torque on the other rotor-piston; through the double-cross, these two torques act onto the power shaft to apply working torque to the load. The reaction from the considerably inclined power shaft causes a strong reaction torque on each rotor-piston, as previously explained: the more oblique, relative to the cylinder axis, the position of the cross between the power shaft and a rotor-piston, the heavier the reaction pair of forces on a plane including the rotor-piston axis, which overloads the bearings of the rotor by idle loads.

In the double-sided double-cross architecture with the power shafts at a Vee, the torque from the gas pressure on a rotor-piston is equally shared between the two double-crosses at the two sides of the rotor-piston, i.e. each double-cross outputs only half of the working torque. Besides (similar explanation as above) the resulting pair of forces at the two sides of the rotor piston offset each other on a plane containing the rotor-piston axis of rotation, eliminating the idle load on the bearings of the rotor-piston.

The combustion bending loads on the casing, also decrease.

In addition the symmetrical support of each rotor at both sides minimizes the rotor flexing and thereby the rotor size and weight. Sealing means, for instance like to those in the rotary Wankel engine, can be used to ensure the sealing of the combustion chamber.

In small-capacity/high-revving applications the engine can operate even without conventional sealing means; the sealing can be achieved by proper labyrinths machined on the "contact"/"sealing" surfaces among the rotor-pistons and the casing of the engine; the shape of these surfaces match each other allowing a wide "surface contact" instead of the "line contact" between the apex of the Wankel rotor and the epitrochoidal wall.

In a first embodiment, FIGS. 1 to 11, the rotary engine drives two counter-rotating propellers.

The casing 1 comprises a cylinder 20 having inlet ports 21 and exhaust ports 22.

The first rotor-piston 2 comprises two blades 23 and 24, it also comprises two flanges 25 and 26. At the two ends of the first rotor piston 2 there are four bosses 27, 28, 29 and 30 for the two crosses 9 and 11.

The second rotor-piston 3 comprises a shaft 31 rotatably and sealingly mounted inside the first rotor-piston 2, it also comprises two blades 32 and 33. At the two ends of the shaft 31 there are four bosses 37, 38, 39 and 40 for the two crosses 13 and 15.

Inside the cylinder 10 they are formed four combustion chambers 41, 42, 43 and 44. The combustion chamber 41 is surrounded by the flanges 25 and 26, by the shaft 31, by the blades 23, 32 and by the cylinder 20.

For the assembly, the shaft 31 is mounted into the rotor 2; then the blades 32 and 33 are secured, by bolds for instance, to the shaft 31.

The free breathing, the lightweight, the compactness, the absence of valve train, the ability to operate with a low-voltage glow plug instead of a high-voltage spark plug, the absence of transmission, the direct drive of the two synchronized counter-rotating and intermeshing propellers which "share"/see the same combustion chamber, the absence of reaction torque about the bisecting axis of the Vee between the two power shafts, the four power pulses per power shaft rotation and the simplicity/reliability enable a portable flyer for manned and un-manned flights.

The two power shafts are at some 60 degrees Vee angle, in the first embodiment, and rotate the two propellers counter-clockwise. The pilot bears the engine on his shoulders when landed, and is suspended from the engine during the flight. The pilot controls the flight by the throttle valve of the engine, and by the position of his body relative to the engine/propellers (an optional control is the pitch control of the blades of the propellers).

In a second embodiment two electric generators replace the propellers of the first embodiment, making a power set or a REM (Range Extender Module); the two power shafts can be arranged in a wider Vee angle as shown in FIG. 12.

In a third embodiment the electric generators of the second embodiment are replaced by two electric motors (not shown), while another pair of inlet and exhaust ports are added to the casing 180 degrees away from the first pair of inlet and exhaust ports, to form a pump.

In a fourth embodiment, FIG. 13, the two power shafts are parallel.

The invention claimed is:

1. A rotary engine comprising at least:
a casing having an inlet port for admitting combustion air, a combustion chamber, and an exhaust port for expelling the burnt air/fuel mixture;
an ignition plug mounted in said casing;
a first rotor-piston rotatably fitted in said casing;
a second rotor-piston rotatably fitted in said casing, the first rotor-piston and the second rotor-piston having a common axis of rotation;
a first power shaft rotatably mounted on said casing, the first power shaft is disposed at one end of the two rotor-pistons, a rotation axis of the first power shaft is inclined to the common rotation axis;
a second power shaft rotatably mounted on said casing, the second power shaft is disposed at the other end of the two rotor-pistons, a rotation axis of the second power shaft is inclined to the common rotation axis, the rotation axis of the first power shaft, the rotation axis of the second power shaft and the common axis of rotation are coplanar, the inclination of the rotation axis of the first power shaft relative to the common rotation axis is equal to the inclination of the rotation axis of the second power shaft relative to the common rotation axis;
a fork of the first power shaft is connected by a cross to the first rotor-piston, a second fork of the first power shaft is connected by a cross to the second rotor-piston, centers of both crosses are on the point where the common rotation axis and the rotation axis of the first power shaft intersect;
a fork of the second power shaft is connected by a cross to the first rotor-piston, a second fork of the second power shaft is connected by a cross to the second rotor-piston, centers of both crosses are on the point where the common rotation axis and the rotation axis of the second power shaft intersect;
wherein the angle of rotation of the first power shaft about the rotation axis and the angle of rotation of the second power shaft about the rotation axis remain equal by the crosses that connect the first and second power shafts with the first and second rotor-pistons to reduce inertia vibrations of the rotary engine, loads on bearings of the rotor-pistons, and load carried by each of the crosses connected to the first rotor piston and the second rotor-piston to the fork of the first power shaft; and by each of the crosses connected to the first rotor piston and the second rotor-piston to the fork of the second power shaft.

2. The rotary engine according claim 1, wherein:
the rotation axis of the first power shaft and the rotation axis of the second power shaft are inclined to each other in a Vee shape.

3. The rotary engine according claim 1, wherein:
the rotation axis of the first power shaft and the rotation axis of the second power shaft are inclined to each other in a Vee shape,
the first power shaft drives a first propeller, the second power shaft drives a second propeller,
the combustion chamber provides power to both propellers eliminating the torque reaction to the engine casing around the bisecting line of the angle between the rotation axis of the first power shaft and the rotation axis of the second power shaft.

4. The rotary engine according claim 1, wherein:
the first power shaft drives a first electric generator, the second power shaft drives a second electric generator.

5. The rotary engine according claim 1, wherein:
an electric motor drives the first power shaft, another electric motor drives the second power shaft.

6. The rotary engine according claim 1 wherein:
the first rotor-piston is tubular and is supported by bearings on the casing,
the second rotor-piston is supported by bearings on the first rotor-piston.

7. The rotary engine according claim 1 wherein:
the casing comprises a shape of cylinder;
the first rotor-piston comprises blades and flanges; the second rotor-piston comprises a shaft and blades secured to the shaft;

the first rotor-piston is tubular and encompasses the blades of the second rotor piston, the blades of the second rotor-piston contact with their side surfaces the flanges of the first rotor-piston and with their front surfaces the cylinder.

8. The rotary engine according claim 1 wherein:
combustion forces on the rotor-pistons are undergone by the crosses and the power shaft bearings.

9. The rotary engine according claim 1 wherein:
combustion forces on the rotor-pistons are indirectly transmitted to the casing, firstly by the crosses to the power shafts and then through the bearings of the power shaft to the casing.

10. The rotary engine according claim 1, wherein:
the rotation axis of the first power shaft and the rotation axis of the second power shaft are parallel.

\* \* \* \* \*